US012573842B2

(12) United States Patent
Sivakumar et al.

(10) Patent No.: US 12,573,842 B2
(45) Date of Patent: Mar. 10, 2026

(54) LOW LEAKAGE ESD STRUCTURE SUITABLE FOR HIGH IMPEDANCE I/O PINS

(71) Applicant: QUALCOMM Incorporated, San Diego, CA (US)

(72) Inventors: Ramkumar Sivakumar, San Diego, CA (US); Dongyang Tang, San Diego, CA (US); Sherif Galal, Irvine, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 128 days.

(21) Appl. No.: 18/429,335

(22) Filed: Jan. 31, 2024

(65) Prior Publication Data

US 2025/0246900 A1     Jul. 31, 2025

(51) Int. Cl.
*H02H 9/02* (2006.01)

(52) U.S. Cl.
CPC .................................. *H02H 9/025* (2013.01)

(58) Field of Classification Search
CPC ....... H02H 9/025; H02H 9/046; H10D 89/811
USPC ........................................................... 361/56
See application file for complete search history.

(56) References Cited

U.S. PATENT DOCUMENTS

| | | | | | |
|---|---|---|---|---|---|
| 6,433,985 | B1 * | 8/2002 | Voldman | .............. | H10D 89/601 |
| | | | | | 361/111 |
| 6,650,165 | B1 * | 11/2003 | Mallikarjunaswamy | .................... | |
| | | | | | H10D 89/601 |
| | | | | | 327/310 |

| | | | | | |
|---|---|---|---|---|---|
| 7,928,753 | B2 * | 4/2011 | Fefer | .................... | G01R 31/002 |
| | | | | | 324/762.01 |
| 10,110,206 | B2 * | 10/2018 | Hummerston | .......... | H03K 5/08 |
| 10,763,251 | B2 * | 9/2020 | Rajagopal | ................ | H02H 3/20 |
| 11,222,889 | B2 * | 1/2022 | Mathur | .................. | H02H 9/046 |
| 11,296,499 | B2 * | 4/2022 | Delshadpour | ........ | H10D 89/601 |
| 11,355,924 | B2 * | 6/2022 | Domanski | .............. | H02H 9/046 |
| 11,398,469 | B1 * | 7/2022 | Karp | ....................... | H01L 23/60 |
| 11,621,556 | B2 * | 4/2023 | Sakai | .................... | H02H 9/046 |
| | | | | | 361/56 |
| 11,837,866 | B1 * | 12/2023 | Fang | ....................... | H02H 9/046 |
| 11,990,747 | B2 * | 5/2024 | Uemura | ............... | H10D 89/611 |
| 2003/0206045 | A1 * | 11/2003 | Mallikarjunaswamy | .................... | |
| | | | | | H10D 89/921 |
| | | | | | 327/310 |
| 2005/0162791 | A1 | 7/2005 | Ahmad et al. | | |

(Continued)

FOREIGN PATENT DOCUMENTS

WO     WO-2014039191 A1 *  3/2014  ............. H02H 3/066

OTHER PUBLICATIONS

International Search Report and Written Opinion—PCT/US2025/011158—ISA/EPO—Apr. 16, 2025.

*Primary Examiner* — Dharti H Patel
(74) *Attorney, Agent, or Firm* — Loza & Loza, LLP

(57) ABSTRACT

In one implementation, an apparatus, such as an ESD protection circuit, is disclosed. The apparatus can include a filter coupled between a local supply voltage rail to a supply voltage rail. A switch circuit can be connected in parallel with the filter. The apparatus can include a clamp configured to 1) provide a first ESD shunt path from an input line to the local supply voltage rail and 2) provide a second ESD shunt path from the input line to a lower voltage rail. A second clamp can be configured to provide a third ESD shunt path from the local supply voltage rail to the lower voltage rail. The switch circuit can be configured to close a switch to bypass the filter.

11 Claims, 5 Drawing Sheets

(56)     References Cited

U.S. PATENT DOCUMENTS

| | | | |
|---|---|---|---|
| 2005/0264964 A1* | 12/2005 | Coronel ................. | H10D 89/60 |
| | | | 361/56 |
| 2009/0316316 A1 | 12/2009 | Shiota | |
| 2010/0103572 A1* | 4/2010 | Worley ................... | H03F 1/523 |
| | | | 361/56 |
| 2011/0128657 A1* | 6/2011 | Akai .................... | H10D 89/819 |
| | | | 361/56 |
| 2013/0105951 A1 | 5/2013 | Popovich et al. | |
| 2013/0155556 A1* | 6/2013 | Tsai ....................... | H10D 89/60 |
| | | | 361/56 |
| 2014/0334046 A1* | 11/2014 | Haruki .................. | H02H 9/046 |
| | | | 361/56 |
| 2015/0092308 A1* | 4/2015 | P ......................... | H10D 89/601 |
| | | | 361/86 |
| 2015/0333508 A1* | 11/2015 | Ko ......................... | H02H 9/046 |
| | | | 361/56 |
| 2015/0346743 A1 | 12/2015 | Bossu et al. | |
| 2015/0348960 A1* | 12/2015 | Gauthier, Jr. ........ | H10D 89/819 |
| | | | 29/25.41 |
| 2015/0380397 A1* | 12/2015 | Dabral ................. | H10D 89/611 |
| | | | 361/56 |
| 2016/0094027 A1* | 3/2016 | Arakawa .............. | H10D 89/819 |
| | | | 361/56 |
| 2018/0183233 A1 | 6/2018 | De Raad et al. | |
| 2024/0250526 A1* | 7/2024 | Ahammed ........... | H10D 89/611 |
| 2025/0246900 A1* | 7/2025 | Sivakumar ............. | H02H 9/046 |
| 2025/0248130 A1* | 7/2025 | Lata ..................... | H10D 89/819 |

* cited by examiner

600

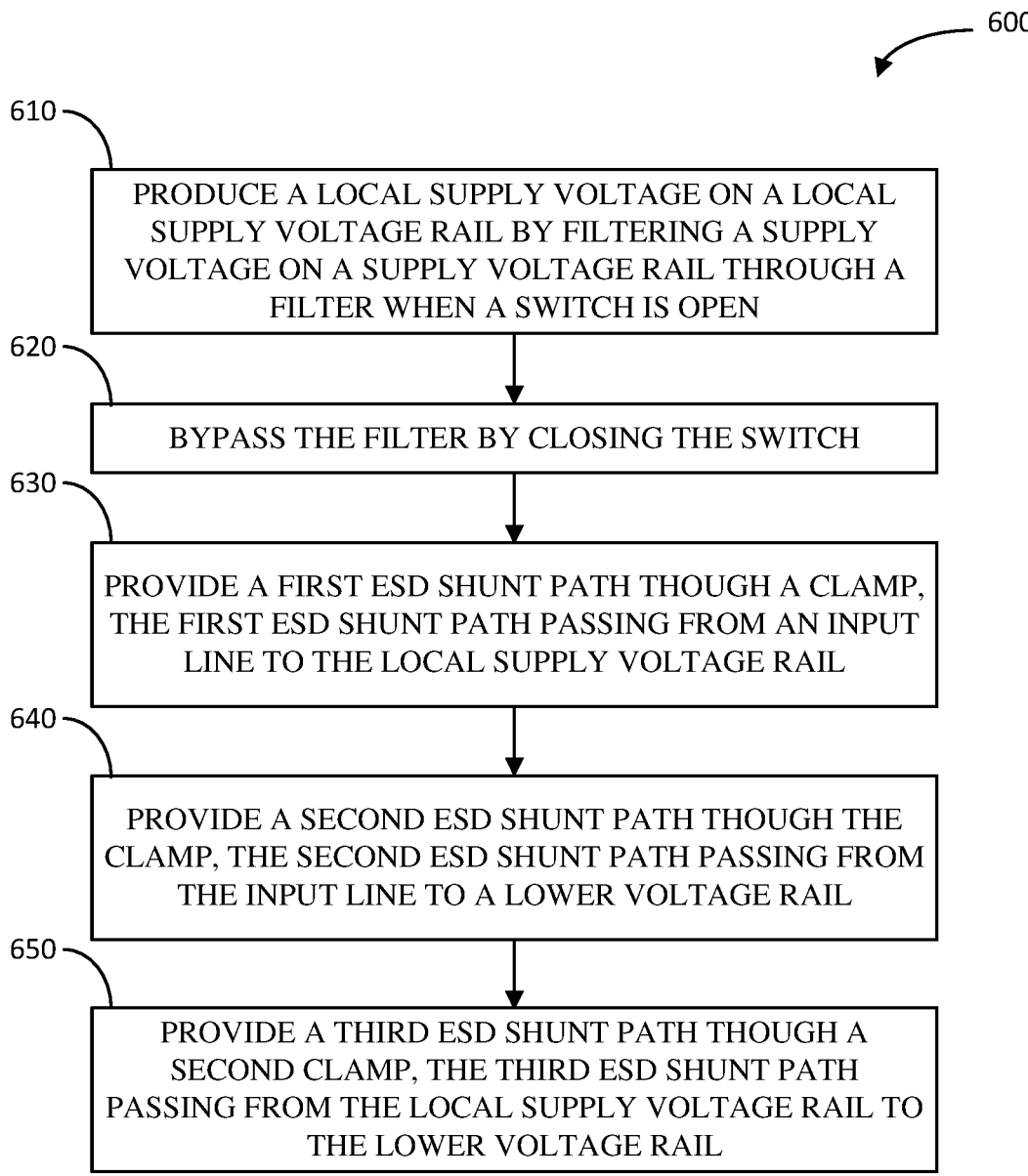

610 — PRODUCE A LOCAL SUPPLY VOLTAGE ON A LOCAL SUPPLY VOLTAGE RAIL BY FILTERING A SUPPLY VOLTAGE ON A SUPPLY VOLTAGE RAIL THROUGH A FILTER WHEN A SWITCH IS OPEN

620 — BYPASS THE FILTER BY CLOSING THE SWITCH

630 — PROVIDE A FIRST ESD SHUNT PATH THOUGH A CLAMP, THE FIRST ESD SHUNT PATH PASSING FROM AN INPUT LINE TO THE LOCAL SUPPLY VOLTAGE RAIL

640 — PROVIDE A SECOND ESD SHUNT PATH THOUGH THE CLAMP, THE SECOND ESD SHUNT PATH PASSING FROM THE INPUT LINE TO A LOWER VOLTAGE RAIL

650 — PROVIDE A THIRD ESD SHUNT PATH THOUGH A SECOND CLAMP, THE THIRD ESD SHUNT PATH PASSING FROM THE LOCAL SUPPLY VOLTAGE RAIL TO THE LOWER VOLTAGE RAIL

FIG. 6

LOW LEAKAGE ESD STRUCTURE SUITABLE FOR HIGH IMPEDANCE I/O PINS

FIELD

Aspects of the present disclosure relate generally to electrostatic discharge (ESD) protection circuits, and in particular to ESD structures for high impedance I/O pins in applications where low leakage and a high power supply rejection ratio (PSRR) are beneficial.

BACKGROUND OF THE INVENTION

Electrostatic discharge (ESD) is a threat to integrated circuits (ICs) because ESD events deliver damaging current spikes that can disrupt sensitive on-chip components. Robust ESD protection is vital to safeguard inputs, outputs, and power rails against direct and indirect ESD strikes. Strategically designed clamp circuits utilizing diodes, transistors and resistors can shunt ESD currents safely to ground while adhering to voltage limits. With smart circuit and layout techniques, ICs can achieve high immunity, making ESD resilience a mandatory design consideration before manufacture.

SUMMARY OF THE INVENTION

The following presents a simplified summary of one or more implementations in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations in a simplified form as a prelude to the more detailed description that is presented later.

An aspect of the disclosure relates to an apparatus. The apparatus includes: a filter (e.g., FIG. 1, 110) coupled between a local supply voltage rail (e.g., FIG. 1 Vdd2) to a supply voltage rail (e.g., FIG. 1 Vdd1); a switch circuit (e.g., FIG. 1, 140) connected in parallel with the filter; a clamp (e.g., FIG. 1, 120) configured to 1) provide a first ESD shunt path (e.g., FIG. 1, 150) from an input line (e.g., FIG. 1, input line 1) to the local supply voltage rail and 2) provide a second ESD shunt path (e.g., FIG. 1, 152) from the input line to a lower voltage rail (e.g., FIG. 1, 170); and a second clamp (e.g., FIG. 1, 130) configured to provide a third ESD shunt path (e.g., FIG. 1, 154) from the local supply voltage rail to the lower voltage rail, wherein the switch circuit is configured to close a switch (e.g., FIG. 1, M2) to bypass the filter.

Another aspect of the disclosure relates to a method. The method can include: producing a local supply voltage on a local supply voltage rail by filtering a supply voltage on a supply voltage rail through a filter when a switch is open; bypassing the filter by closing the switch; providing a first ESD shunt path though a clamp, the first ESD shunt path passing from an input line to the local supply voltage rail; providing a second ESD shunt path though the clamp, the second ESD shunt path passing from the input line to a lower voltage rail; and providing a third ESD shunt path though a second clamp, the third ESD shunt path passing from the local supply voltage rail to the lower voltage rail.

Another aspect of the disclosure relates to an integrated circuit. The integrated circuit can include: an input line connected to an input pad of the integrated circuit; a switched filter circuit coupled between a local supply voltage rail and a supply voltage rail; a clamp configured to 1) provide a first ESD shunt path from the input line to the local supply voltage rail and 2) provide a second ESD shunt path from the input line to a lower voltage rail; and a second clamp configured to provide a third ESD shunt path from the local supply voltage rail to the lower voltage rail.

To the accomplishment of the foregoing and related ends, the one or more implementations include the features hereinafter fully described and particularly pointed out in the claims. The following description and the annexed drawings set forth in detail certain illustrative aspects of the one or more implementations. These aspects are indicative, however, of but a few of the various ways in which the principles of various implementations may be employed and the description implementations are intended to include all such aspects and their equivalents.

BRIEF DESCRIPTION OF THE DRAWINGS

FIG. 6 illustrates a flow diagram of an example method of providing ESD protection in accordance with another aspect of the disclosure.

DETAILED DESCRIPTION

Figure 1:
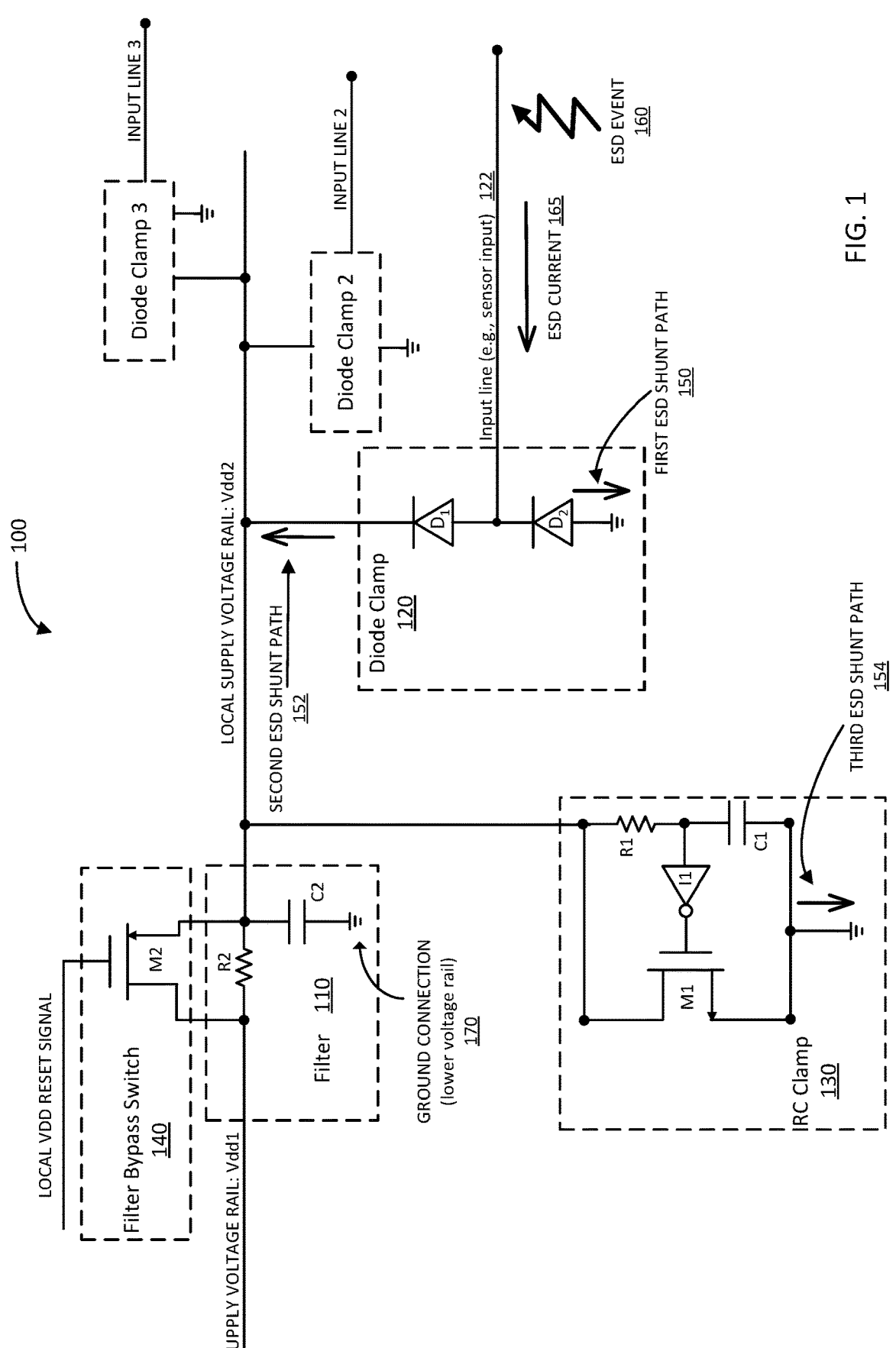
FIG. 1 illustrates a circuit diagram of an example ESD protection circuit, in accordance with an aspect of the disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Integrated circuits (ICs) can receive analog input signals from sensors and can convert those analog signals to digital signals for subsequent processing in the digital realm. For some applications, such as medical imaging sensors, the sensor signals are very faint. Highly sensitive amplifiers with high input impedance may therefore be required. Another requirement is ESD protection. An integrated circuit (IC) can have ESD protection circuits on the sensor input lines. The ESD protection circuits should not lower the sensor signal, bias the sensor signal, or inject noise into the sensor signal. The input leakage current of an ESD protection circuit can lower the sensor signal by leaking some of the sensor signal to ground or to a supply rail. One source of bias is charge accumulating on a line due to capacitive coupling. Another source of noise is the noise that can be coupled into power supply lines. Previously available ESD protection solutions have proven deficient for certain applications.

The supply voltage provided by a power supply includes noise that may be coupled into the sensor signal via the ESD circuitry. Noise coupled into the sensor signal via the ESD circuitry may be reduced by powering the ESD circuitry from a local supply voltage rail carrying a local supply voltage that is less noisy than the supply voltage. The local supply voltage can be provided by filtering the supply voltage. A low leakage ESD circuit (e.g., a diode clamp) can provide the high input impedance needed for the sensor signals while providing paths for shunting ESD current from ESD events to the lower voltage rail (e.g., ground) or to the local supply voltage rail. Filtering the supply voltage to obtain the local supply voltage has a side effect in that a filter blocks ESD currents from passing from the local supply voltage rail to the supply voltage rail. As such, a second ESD protection circuit can shunt the ESD charge out of the local supply voltage line. The second ESD protection circuit should have a PSRR such that the second ESD protection circuit does not add noise to the local supply voltage line and hence to the sensor signal. As such, an RC clamp, which has no PSRR issues because it is referenced to ground, can be used as the second ESD protection circuit. Another issue is that charge can accumulate on a local supply voltage rail that only has high impedance paths to ground and to the supply voltage rail. A switch, such as a field effect transistor (FET) can be connected in parallel with the filter such that closing the switch resets the voltage level on the local supply voltage line relative to the supply voltage line. The switch may be closed during periods when the sensor is not being read and open when the sensor signal is being read or is about to be read.

FIG. 1 illustrates a circuit diagram 100 of an example ESD protection circuit, in accordance with an aspect of the disclosure. A filter 110 is coupled between the supply voltage rail (Vdd1) and the local supply voltage rail (Vdd2). As such, the filter 110 provides a current path between Vdd1 and Vdd2. The current path provided by the filter can be a high impedance path. The filter 110 includes a resistive device (R2) coupled between Vdd1 and Vdd2 and includes a capacitor (C2) coupled between Vdd2 and the lower voltage rail. Connections to the lower voltage rail are shown as ground connections. In an example, R2 is 40 k ohms and C2 is 100 pF. A switching circuit, the filter bypass switch 140, is also coupled between Vdd1 and Vdd2. Closing a switch (M2) in the switching circuit bypasses the filter 110 by creating a low impedance path between Vdd1 and Vdd2. When M2 is open, Vdd2 has no low impedance paths to ground or to the supply voltage rail. As such, capacitive coupling into Vdd2 may change the local supply voltage on Vdd2 and thereby bias a sensor input. Closing M2 resets the local supply voltage on Vdd2 relative to the supply voltage Vdd1.

An input line 122 can carry a sensor signal. The input line 122 can be connected to a clamp circuit, such as diode clamp 120. An ESD event 160 on the input line can result in an ESD current 165 that may damage circuits. The diode clamp 120 can shunt the ESD current to the lower voltage rail 170 via a first ESD shunt path 150 or to Vdd2 via a second ESD shunt path 152. The diode clamp 120 includes a first diode (D1) and a second diode (D2). The D1 cathode is connected to the local supply voltage rail. The D1 anode is connected to the input line and to the D2 cathode. The D2 anode is connected to the lower voltage rail.

The diode clamp 120 can shunt an ESD current into Vdd2. A second clamp can shunt the ESD current out of Vdd2. In the example, RC clamp 130 provides a third ESD shunt path 154 and can shunt ESD current 165 from Vdd2 to the lower voltage rail 170. The RC clamp 130 includes a FET (M1), a resistive device (R1), a capacitor (C1), and an inverter (I1). M1 is coupled between Vdd2 and the lower voltage rail. In an example, the drain of M1 is connected to the local supply voltage rail, and the source of M1 is connected to the lower voltage rail. R1 is coupled between Vdd2 and the input end of I1. C1 is coupled between the input end of I1 and the lower voltage rail. The output end of I1 is connected to the gate of M1. In the example illustrated in FIG. 1, the input impedance of I1 may substantially prevent current from flowing into the input end of I1. As such, R1 and C1 may be considered to be connected in series. An aspect of the example illustrated in FIG. 1 is that additional inputs may be ESD protected by adding one diode clamp per input line. The additional diode clamps may all shunt ESD current to Vdd2 or to the lower voltage rail 170.

Figure 2:
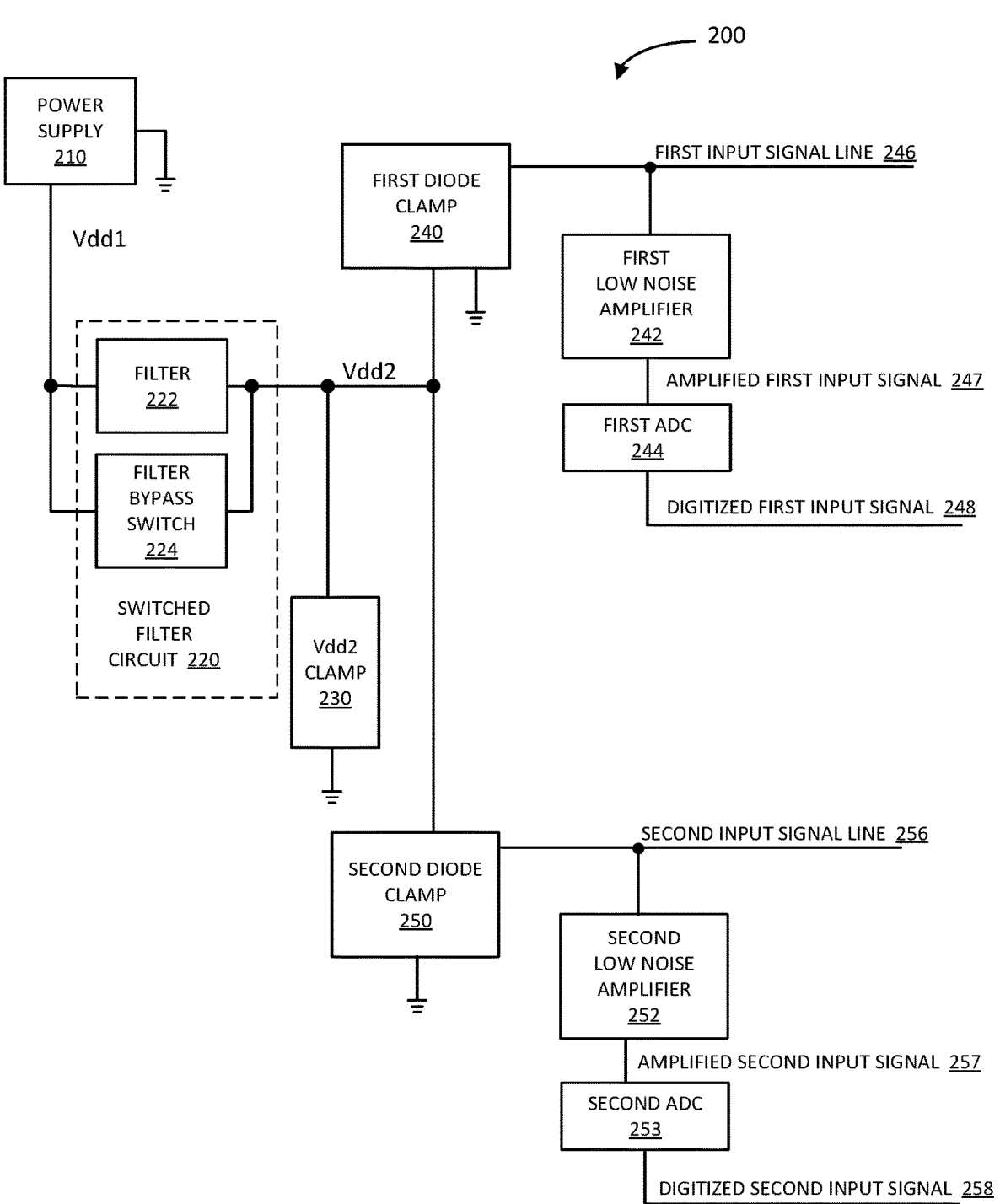
FIG. 2 illustrates a block diagram of an example ESD protection circuit in accordance with another aspect of the disclosure.

FIG. 2 illustrates a block diagram 200 of an example ESD protection circuit in accordance with another aspect of the disclosure. A power supply 210 is connected to the supply voltage rail Vdd1 and thereby powers the illustrated example. A switched filter circuit 220 connects Vdd1 to the local supply voltage rail Vdd2. The switched filter circuit 220 includes a filter 222 and a filter bypass switch 224. The filter 222 is connected to Vdd1 and Vdd2. The filter filters the supply voltage and provides the filtered supply voltage to Vdd2. The local supply voltage on Vdd2 is therefore the filtered supply voltage. The filter bypass switch 224 is connected to Vdd1 and Vdd2. Closing the filter bypass switch 224 creates a low impedance path between Vdd1 and Vdd2 to thereby reset the local supply voltage relative to the supply voltage. Vdd2 is connected to a first diode clamp 240, a second diode clamp 250, and to Vdd2 clamp 230. Vdd2 clamp 230 can be a RC clamp similar to RC clamp 130 illustrated in FIG. 1. The first diode clamp 240 and the second diode clamp 250 can be diode clamps similar to diode clamp 120 illustrated in FIG. 1. An ESD current shunted into Vdd2 by the first diode clamp 240 or the second diode clamp 250 can be shunted out of Vdd2 by the Vdd2 clamp 230.

A first input signal line 246 is connected to the first diode clamp 240 such that an ESD current produced by an ESD event on the first input signal line 246 can be shunted to the lower voltage rail or to Vdd2. The first input signal line 246 is also connected to a first low noise amplifier 242 that amplifies the first input signal to produce an amplified first input signal 247. An analog to digital converter (ADC) can produce a digital reading indicative of the voltage level of an input to the ADC. As such, the first ADC 244 can produce a digitized first input signal 248 that is indicative of the voltage level of the amplified first input signal and is thereby indicative of the voltage level of the first input signal. The first low noise amplifier 242 and the first ADC 244 are ESD protected by the first diode clamp 240 and by Vdd2 clamp 230. Those practiced in the art are familiar with low noise amplifiers, low noise amplifier circuits, analog to digital converters, and analog to digital converter circuits.

A second input signal line 256 is connected to the second diode clamp 250 such that an ESD current produced by an ESD event on the second input signal line 256 can be shunted to the lower voltage rail or to Vdd2. The second input signal line 256 is also connected to a second low noise amplifier 252 that amplifies the second input signal to produce an amplified second input signal 257. The second ADC 253 can produce a digitized second input signal 258 that is indicative of the voltage level of the amplified second input signal and is thereby indicative of the voltage level of the second input signal. The second low noise amplifier 252 and the second ADC 253 are ESD protected by the second diode clamp 250 and by Vdd2 clamp 230.

Figure 3:
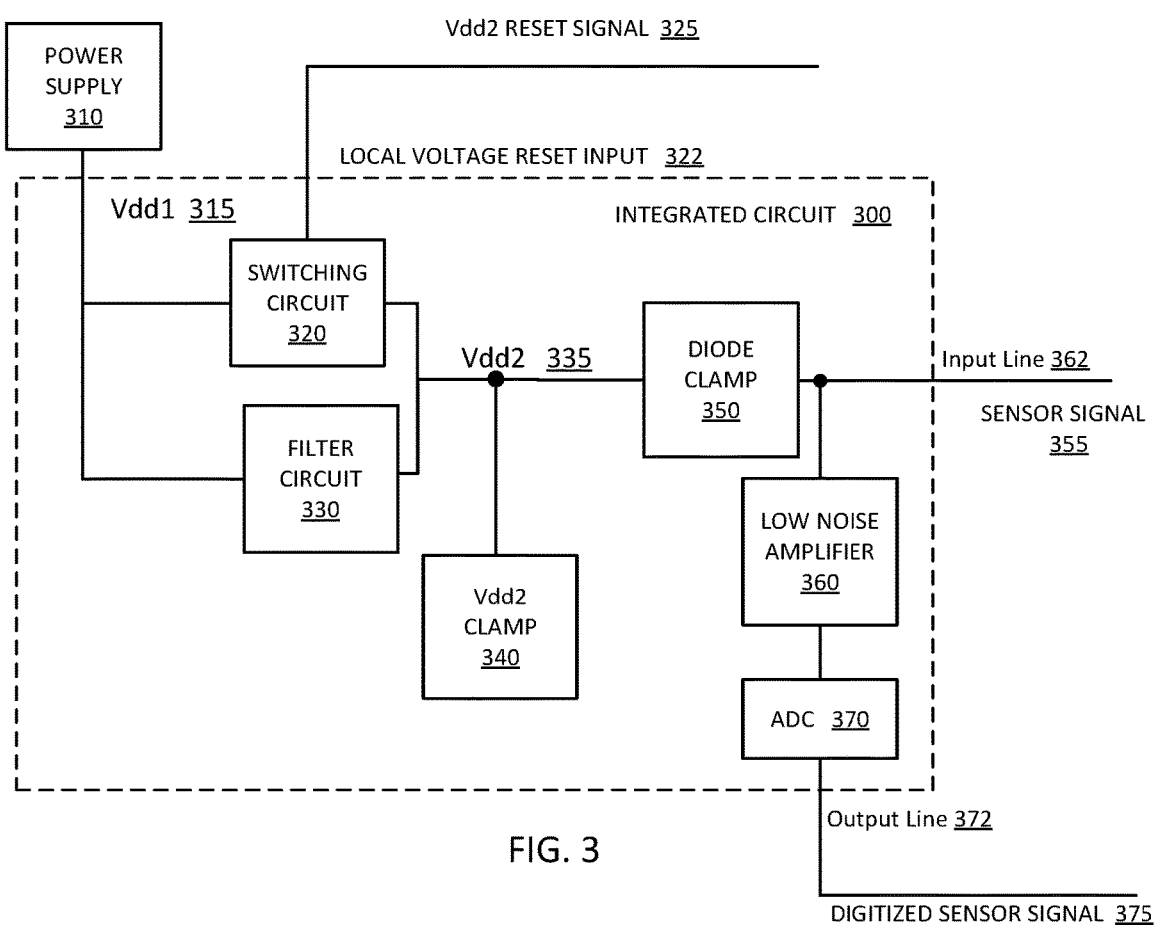
FIG. 3 illustrates a block diagram of an example of an integrated circuit with ESD protection in accordance with another aspect of the disclosure.

FIG. 3 illustrates a block diagram of an example of an integrated circuit 300 with ESD protection in accordance with another aspect of the disclosure. The integrated circuit includes a supply voltage rail 315, a local supply voltage rail 335, a switching circuit 320, a filter circuit 330, a diode clamp 350, a low noise amplifier 360, and an ADC 370. A power supply 310 is connected to the supply voltage rail 315 (Vdd1) and thereby powers the integrated circuit 300. The switching circuit 320 is connected to Vdd1 and Vdd2. The switching circuit 320 can include a switch such as FET M2 illustrated in FIG. 1. The switch can be a p-channel FET such that a low voltage on the gate of the FET causes the FET to enter a conductive mode and thereby create a low impedance path between Vdd1 and Vdd2. More generally, closing the switch in the switching circuit 320 creates a low impedance path between Vdd1 and Vdd2 to thereby reset the local supply voltage relative to the supply voltage. The filter circuit 330 is connected to Vdd1 and Vdd2. The filter circuit 330 can be an RC circuit such as filter 110 illustrated in FIG. 1. The filter circuit 330 filters the supply voltage and provides the filtered supply voltage to Vdd2. The local supply voltage on Vdd2 is therefore the filtered supply voltage. Vdd2 is connected to a diode clamp 350 and to Vdd2 clamp 340. Vdd2 clamp 340 can be a RC clamp similar to RC clamp 130 illustrated in FIG. 1. The diode clamp 350 can be a diode clamp similar to diode clamp 120 illustrated in FIG. 1. An ESD current shunted into Vdd2 by the diode clamp 350 can be shunted out of Vdd2 by the Vdd2 clamp 340. The integrated circuit 300 can receive a sensor signal 355 on an input line 362 connected to the diode clamp 350 and the low noise amplifier 360. The low noise amplifier can amplify the sensor signal to a level that can be read by the ADC 370. The ADC produces a digitized sensor signal 375 that indicates the voltage level of the sensor signal 355. The digitized sensor signal may be output from the integrated circuit on an output line 372. The integrated circuit 300 can receive a Vdd2 reset signal 325 on a local voltage reset input 322 that is connected to the switching circuit 320. The Vdd2 reset signal 325 can control the switching circuit 320 to thereby cause the switching circuit to open and close a low impedance path between Vdd1 and Vdd2.

Figure 4:
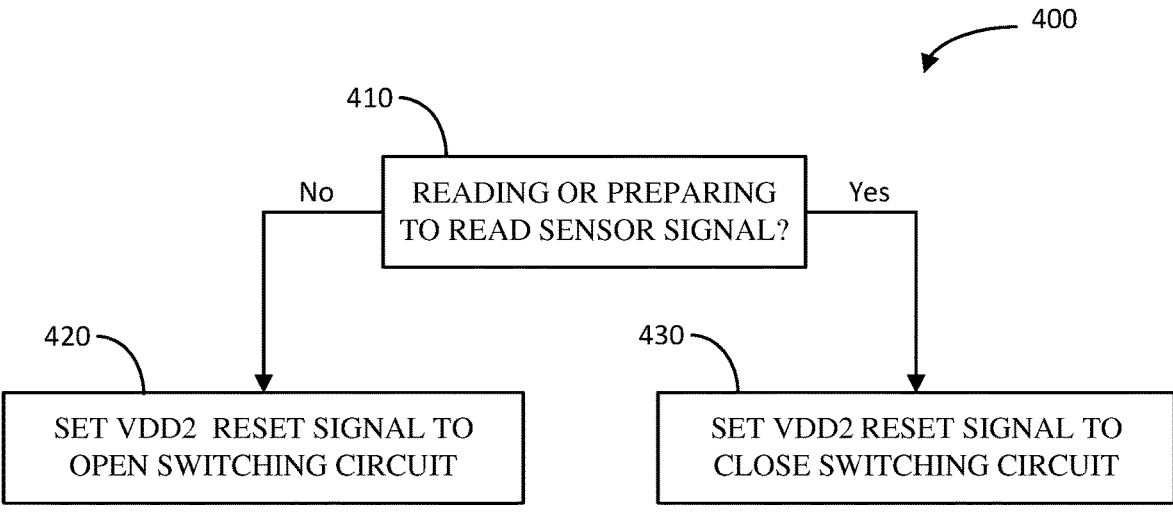
FIG. 4 illustrates a flow diagram of an example method of controlling a switch that bypasses a filter of an ESD protection circuit in accordance with another aspect of the disclosure.

FIG. 4 illustrates a flow diagram of an example method 400 of controlling a switch that bypasses a filter of an ESD protection circuit in accordance with another aspect of the disclosure. The Vdd2 reset signal 325 can control the switching circuit 320. In an example, the switching circuit 320 includes a p-channel FET (PFET) such that the switching circuit provides a low impedance path between Vdd1 and Vdd2 when the Vdd2 reset signal is low (e.g., a low voltage is present on local voltage reset input 322). The PFET and switching circuit can stop conducting between Vdd1 and Vdd2 when the Vdd2 reset signal is high (e.g., a high voltage is present on local voltage reset input 322). Those practiced in electronics are familiar with the gate, source, and drain voltage levels required for turning a FET on or off. Here, a p-channel device may be preferred because the source and drain of the FET are at or close to the supply voltage. At block 410, it is determined whether the sensor signal is about to be read or is being read. At block 420, the Vdd2 reset signal may be set to close the switching circuit in response to determining at block 410 that the sensor signal is about to read or is being read. Closing the switching circuit connects Vdd2 to Vdd1. At block 430, the Vdd2 reset signal may be set to open the switching circuit in response to determining at block 410 that the sensor signal is not about to read and is not being read. Opening the switching circuit disconnects the path from Vdd2 to Vdd1 via the switching circuit.

Figure 5:
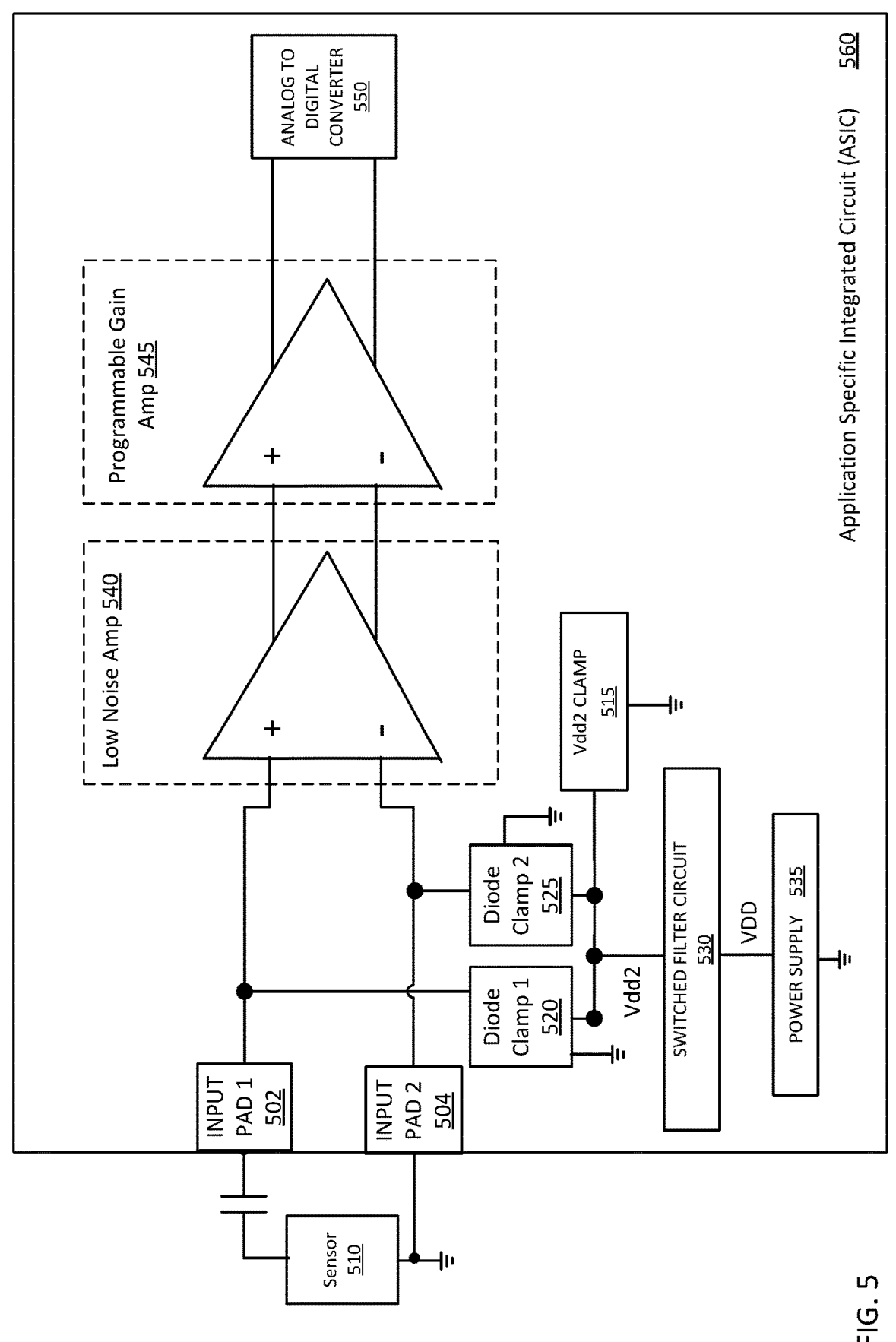
FIG. 5 illustrates a block diagram of an ESD protection circuit implemented in an integrated circuit in accordance with another aspect of the disclosure.

FIG. 5 illustrates a block diagram of an ESD protection circuit implemented in an application specific integrated circuit 560 (ASIC) in accordance with another aspect of the disclosure. The sensor 510 is connected to the ASIC 560 at a first input pad 502 and a second input pad 504. In an example, a sensor ground reference is passed to the second input pad 504 and a sensor output signal is passed to the first input pad. The first input pad 502 is connected to the non-inverting input of a low noise amplifier 540. The second input pad is connected to the inverting input of the low noise amplifier 540. The outputs of the low noise amplifier 540 are passed to a programmable gain amplifier 545. The outputs of the programmable gain amplifier 545 are passed to an ADC 550 that can produce a digital version of the sensor signal. The first input is connected to a first diode clamp 520. The second input pad 504 is connected to a second diode clamp 525. The first diode clamp 520 can shunt an ESD current caused by an ESD event at the first input pad 502 to the lower voltage rail or to the local supply voltage rail (Vdd2). The second diode clamp 525 can shunt an ESD current caused by an ESD event at the second input pad 504 to the lower voltage rail or to the local supply voltage rail (Vdd2). A Vdd2 clamp 515 can shunt an ESD current from Vdd2 to the lower voltage rail. A power supply 535 can provide supply voltage on a supply voltage rail (Vdd1). A switched filter circuit 530 can connect Vdd2 to Vdd1 via a filter that filters power supply noise from the supply voltage such that less noise is in the local supply voltage on the local supply voltage rail Vdd2. A switch in the switched filter circuit may close to thereby create a non-filtered path between Vdd1 and Vdd2. In an example, closing the switch creates a low impedance path between Vdd1 and Vdd2. The voltage on the local supply voltage rail may drift while the switch is open due to noise, capacitive coupling to other lines, etc. Closing the switch sets the voltage on the local supply voltage rail relative to the supply voltage, thereby removing voltage drift that may have occurred while the switch was open.

FIG. 6 illustrates a flow diagram of an example method of providing ESD protection 600 in accordance with another aspect of the disclosure. At block 610, a local supply voltage is produced on a local supply voltage rail by filtering a supply voltage on a supply voltage rail through a filter when a switch is open. At block 620, the filter is bypassed by closing the switch. At block 630, a first ESD shunt path through a clamp is provided, the first ESD shunt path passing from an input line to the local supply voltage rail. At block 640, a second ESD shunt path through the clamp is provided, the second ESD shunt path passing from the input line to a lower voltage rail. At block 650, a third ESD shunt path through a second clamp is provided, the third ESD shunt path passing from the local supply voltage rail to the lower voltage rail.

The following provides an overview of aspects of the present disclosure:

Aspect 1: An apparatus, comprising: a filter coupled between a local supply voltage rail to a supply voltage rail; a switch circuit connected in parallel with the filter; a clamp configured to 1) provide a first ESD shunt path from an input line to the local supply voltage rail and 2) provide a second ESD shunt path from the input line to a lower voltage rail; and a second clamp configured to provide a third ESD shunt path from the local supply voltage rail to the lower voltage rail, wherein the switch circuit is configured to close a switch to bypass the filter.

Aspect 2: The apparatus of aspect 1, wherein the clamp comprises a first diode that includes a first diode anode connected to the input line and a first diode cathode connected to the local supply voltage rail; and a second diode that includes a second diode anode connected to the lower voltage rail and a second diode cathode connected to the input line.

Aspect 3: The apparatus of aspect 1 or 2, wherein the second clamp comprises a first field effect transistor (FET) coupled between the local supply voltage rail and the lower voltage rail.

Aspect 4: The apparatus of aspect 1, wherein the second clamp comprises a first resistive device and a first capacitor configured to provide a current path between the local supply voltage rail and the lower voltage rail.

Aspect 5: The apparatus of aspect 4, wherein the first resistive device and the first capacitor are connected in series.

Aspect 6: The apparatus of aspect 4 or 5, wherein a first end of the first resistive device is connected to a first end of the first capacitor; a second end of the first resistive device is connected to the local supply voltage rail; and a second end of the first capacitor is connected to the lower voltage rail.

Aspect 7: The apparatus of aspects 4-6, wherein an input end of an inverter is connected to the first end of the first resistive device and to the first end of the first capacitor; and an output end of the inverter is connected to a first gate of the first FET.

Aspect 8: The apparatus of any one of aspects 3-7, wherein a first drain of the first FET is connected to the local supply voltage rail; and a first source of the first FET is connected to the lower voltage rail.

Aspect 9: The apparatus of any one of aspects 1-8, wherein the filter comprises: a second resistive device coupled between the supply voltage rail and the local supply voltage rail; and a second capacitor coupled between the local supply voltage rail and the lower voltage rail.

Aspect 10: The apparatus of any one of aspects 1-9, wherein the switch comprises a second FET.

Aspect 11: The apparatus of aspect 10, wherein the second FET is configured to switch between a conducting state and a nonconducting state in response to a local voltage reset signal input to a second gate of the second FET.

Aspect 12: The apparatus of any one of aspects 1-11, wherein the switch is a second FET that is a p-channel FET.

Aspect 13: A method, comprising: producing a local supply voltage on a local supply voltage rail by filtering a supply voltage on a supply voltage rail through a filter when a switch is open; bypassing the filter by closing the switch; providing a first ESD shunt path though a clamp, the first ESD shunt path passing from an input line to the local supply voltage rail; providing a second ESD shunt path though the clamp, the second ESD shunt path passing from the input line to a lower voltage rail; and providing a third ESD shunt path though a second clamp, the third ESD shunt path passing from the local supply voltage rail to the lower voltage rail.

Aspect 14: The method of aspect 13, wherein the clamp comprises: a first diode that includes a first diode anode connected to the input line and a first diode cathode connected to the local supply voltage rail; and a second diode that includes a second diode anode connected to the lower voltage rail and a second diode cathode connected to the input line.

Aspect 15: The method of any one of aspects 13-14, further including shunting an ESD current through the second ESD shunt path and the third ESD shunt path.

Aspect 16: The method of any one of aspects 13-15, wherein the second clamp comprises: a first field effect transistor (FET) coupled between the local supply voltage rail and the lower voltage rail; and a first resistive device and a first capacitor configured to provide a current path between the local supply voltage rail and the lower voltage rail, wherein: a first end of the first resistive device is connected to a first end of the first capacitor; a second end of the first resistive device is connected to the local supply voltage rail; and a second end of the first capacitor is connected to the lower voltage rail.

Aspect 17: The method of aspect 16, wherein: an input end of an inverter is connected to the first end of the first resistive device and to the first end of the first capacitor; and an output end of the inverter is connected to a first gate of the first FET.

Aspect 18: An integrated circuit, comprising: an input line connected to an input pad of the integrated circuit; a switched filter circuit coupled between a local supply voltage rail and a supply voltage rail; a clamp configured to 1) provide a first ESD shunt path from the input line to the local supply voltage rail and 2) provide a second ESD shunt path from the input line to a lower voltage rail; and a second clamp configured to provide a third ESD shunt path from the local supply voltage rail to the lower voltage rail.

Aspect 19: The integrated circuit of aspect 18, wherein the clamp comprises: a first diode that includes a first diode anode connected to the input line and a first diode cathode connected to the local supply voltage rail; and a second diode that includes a second diode anode connected to the lower voltage rail and a second diode cathode connected to the input line.

Aspect 20: The integrated circuit of aspects 18-19, wherein the second clamp comprises: a first field effect transistor (FET) coupled between the local supply voltage rail and the lower voltage rail; and a first resistive device and a first capacitor configured to provide a current path between the local supply voltage rail and the lower voltage rail.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed:
1. An apparatus comprising:
a filter coupled between a local supply voltage rail to a supply voltage rail, wherein the filter comprises
a first resistive device coupled between the supply voltage rail and the local supply voltage rail, and
a first capacitor coupled between the local supply voltage rail and the lower voltage rail;
a switch circuit connected in parallel with the filter;
a clamp configured to 1) provide a first ESD shunt path from an input line to the local supply voltage rail and

2) provide a second ESD shunt path from the input line to a lower voltage rail; and a second clamp configured to provide a third ESD shunt path from the local supply voltage rail to the lower voltage rail, wherein the switch circuit is configured to close a switch to bypass the filter.

2. The apparatus of claim 1, wherein the clamp comprises:

a first diode that includes a first diode anode connected to the input line and a first diode cathode connected to the local supply voltage rail; and a second diode that includes a second diode anode connected to the lower voltage rail and a second diode cathode connected to the input line.

3. The apparatus of claim 2, wherein the second clamp comprises a first field effect transistor (FET) coupled between the local supply voltage rail and the lower voltage rail.

4. The apparatus of claim 3, wherein:

the second clamp comprises a second resistive device and a second capacitor configured to provide a current path between the local supply voltage rail and the lower voltage rail.

5. The apparatus of claim 4, wherein the second resistive device and the second capacitor are connected in series.

6. The apparatus of claim 4, wherein:

a first end of the second resistive device is connected to a first end of the second capacitor;

a second end of the second resistive device is connected to the local supply voltage rail; and a second end of the second capacitor is connected to the lower voltage rail.

7. The apparatus of claim 6, wherein:

an input end of an inverter is connected to the first end of the second resistive device and to the first end of the second capacitor; and an output end of the inverter is connected to a first gate of the first FET.

8. The apparatus of claim 3, wherein:

a first drain of the first FET is connected to the local supply voltage rail; and a first source of the first FET is connected to the lower voltage rail.

9. The apparatus of claim 1, wherein the switch comprises a second FET.

10. The apparatus of claim 9, wherein:

the second FET is configured to switch between a conducting state and a nonconducting state in response to a local voltage reset signal input to a second gate of the second FET.

11. The apparatus of claim 1, wherein the switch is a second FET that is a p-channel FET.

\* \* \* \* \*